(12) United States Patent
Kurashige et al.

(10) Patent No.: US 10,866,351 B2
(45) Date of Patent: Dec. 15, 2020

(54) LIGHTING DEVICE

(71) Applicant: Dai Nippon Printing Co., Ltd., Tokyo (JP)

(72) Inventors: Makio Kurashige, Tokyo (JP); Shumpei Nishio, Tokyo (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days.

(21) Appl. No.: 16/078,848

(22) PCT Filed: Feb. 23, 2017

(86) PCT No.: PCT/JP2017/006848
§ 371 (c)(1),
(2) Date: Aug. 22, 2018

(87) PCT Pub. No.: WO2017/146154
PCT Pub. Date: Aug. 31, 2017

(65) Prior Publication Data
US 2019/0049647 A1    Feb. 14, 2019

(30) Foreign Application Priority Data

Feb. 24, 2016 (JP) .................. 2016-033207

(51) Int. Cl.
*F21V 1/00* (2006.01)
*G02B 5/32* (2006.01)
(Continued)

(52) U.S. Cl.
CPC .................. *G02B 5/32* (2013.01); *F21V 5/04* (2013.01); *G02B 27/0955* (2013.01)

(58) Field of Classification Search
None
See application file for complete search history.

(56) References Cited

U.S. PATENT DOCUMENTS

2005/0237493 A1   10/2005   Tajiri
2008/0225361 A1   9/2008   Kasazumi et al.
(Continued)

FOREIGN PATENT DOCUMENTS

EP   2 615 502 A1   7/2013
JP   2005-331906 A1   12/2005
(Continued)

OTHER PUBLICATIONS

English translation of International Preliminary Report on Patentability (Chapter I) (Application No. PCT/JP2017/006848) dated Sep. 7, 2018, 9 pages.

(Continued)

*Primary Examiner* — Vip Patel
(74) *Attorney, Agent, or Firm* — Burr & Brown, PLLC

(57) ABSTRACT

A lighting device capable of illuminating an entire region of a region to be illuminated with uniform brightness and with a desired color is provided. Provided is a lighting device that extends in a first direction and illuminates a region to be illuminated that extends in a second direction intersecting with the first direction includes a light source that emits coherent light, and a plurality of hologram components each of which diffracts the coherent light emitted by the light source to illuminate the entire region of the region to be illuminated. At least one of the plurality of hologram components diffracts the incident coherent light so that illuminance at both end portions in the second direction of the region to be illuminated is higher than the illuminance at the central portion.

18 Claims, 6 Drawing Sheets

(51) Int. Cl.
*G02B 27/09* (2006.01)
*F21V 5/04* (2006.01)

(56) References Cited

U.S. PATENT DOCUMENTS

| | | |
|---|---|---|
| 2010/0097674 A1 | 4/2010 | Kasazumi et al. |
| 2011/0242451 A1 | 10/2011 | Koepf |
| 2013/0170007 A1 | 7/2013 | Kurashige et al. |

FOREIGN PATENT DOCUMENTS

| | | |
|---|---|---|
| JP | 2008-145669 A1 | 6/2008 |
| JP | 2010-210854 A | 9/2010 |
| JP | 2012-146621 A1 | 8/2012 |
| JP | 2015-132707 A1 | 7/2015 |
| WO | 2005/073798 A1 | 8/2005 |
| WO | 2012/033174 A1 | 3/2012 |
| WO | 2012/150945 A1 | 11/2012 |

OTHER PUBLICATIONS

International Search Report and Written Opinion (Application No. PCT/JP2017/006848) dated May 23, 2017.
Extended European Search Report, European Application No. 17756592.6, dated Oct. 7, 2019 (8 pages).
Chinese Office Action (with English translation), Chinese Application No. 201780012053.7, dated Dec. 16, 2019 (18 pages).
Japanese Office Action (Application No. 2018-501764) dated May 19, 2020 (with English translation).
Chinese Office Action (Application No. 201780012053.7) dated Jul. 14, 2020 (with English translation).

LIGHTING DEVICE

BACKGROUND OF THE INVENTION

1. Field of the Invention

The present disclosure relates to a lighting device that illuminates a region to be illuminated that extends in a first direction and in a second direction.

2. Description of Related Art

A lighting device that combines a light source and a hologram component to illuminate a road surface with a desired pattern has been proposed (see JP2015-132707 A). In the lighting device disclosed in this publication, a laser beam generated by a single light source is diffracted by a single hologram component.

SUMMARY OF THE INVENTION

In order to illuminate the road surface with a desired color, it is necessary to provide a plurality of hologram components and to superimpose the diffracted light from each hologram component on the road surface.

However, it is difficult to match the positions of the region to be illuminated on the road surface for all the hologram components, and colors are separated at least near the edge of the region to be illuminated. For this reason, the edge of the region to be illuminated is blurred or visually recognized with a color different from the original color. As described above, it is technically difficult to provide a plurality of hologram components and to illuminate the entire region to be illuminated with uniform brightness and with a desired color.

The present disclosure provides a lighting device capable of illuminating the entire region of a region to be illuminated with uniform brightness and with a desired color.

In order to solve the above problem, an embodiment of the present disclosure provides a lighting device that illuminates a region to be illuminated extending in a first direction and extending in a second direction intersecting with the first direction, wherein the lighting device includes a light source that emits coherent light, and a plurality of hologram components each of which diffracts the coherent light emitted by the light source to illuminate an entire region of the region to be illuminated, wherein at least one of the plurality of hologram components diffracts the incident coherent light so that illuminance at both end portions in the second direction of the region to be illuminated is higher than illuminance at a central portion.

At least one of the plurality of hologram components may include a plurality of element hologram components, and the element hologram component may diffract the incident coherent light to illuminate the entire region of the region to be illuminated.

At least one of the plurality of element hologram components may diffract the incident coherent light so that illuminance at the both end portions in the second direction of the region to be illuminated is higher than illuminance at the central portion in the second direction.

An embodiment of the present disclosure provides a lighting device that illuminates a region to be illuminated extending in a first direction and extending in a second direction intersecting with the first direction, wherein the lighting device includes a plurality of light sources each of which emits coherent light in different wavelength regions, and a plurality of hologram components each of which diffracts the coherent light emitted by a corresponding light source among the plurality of light sources to illuminate with different illumination colors an entire region of the region to be illuminated, wherein the plurality of hologram components diffracts the incident coherent light so that irradiance at both end portions in the second direction of the region to be illuminated is different from irradiance at a central portion.

At least one of the plurality of hologram components may diffract the incident coherent light so that illuminance at the both end portions in the second direction of the region to be illuminated is higher than illuminance at the central portion.

At least one of the plurality of hologram components may include a plurality of element hologram components, and the element hologram component may diffract the incident coherent light to illuminate the entire region of the region to be illuminated.

At least one of the plurality of element hologram components may diffract the incident coherent light so that illuminance at the both end portions in the second direction of the region to be illuminated is higher than illuminance at the central portion.

The plurality of hologram components may diffract the incident coherent light so that both edge positions of the region to be illuminated passing through both end portions in the second direction of the region to be illuminated and extending in the first direction are aligned.

An embodiment of the present disclosure is directed to a lighting device that illuminates a region to be illuminated extending in a first direction and extending in a second direction intersecting with the first direction, wherein the lighting device includes a light source that emits coherent light, and a plurality of hologram components each of which diffracts the coherent light emitted by the light source to illuminate an entire region of the region to be illuminated, wherein at least one of the plurality of hologram components diffracts the incident coherent light so that chromaticity at both end portions in the second direction of the region to be illuminated is different from chromaticity at a central portion.

The plurality of hologram components may diffract the incident coherent light so that both edge positions passing through both end portions in the first direction of the region to be illuminated and extending in the second direction are aligned.

The region to be illuminated may be disposed on a predetermined two-dimensional plane within an angular space in which diffracted light from the plurality of hologram components travels, and the plurality of hologram components may be disposed along the second direction on the two-dimensional plane.

The region to be illuminated may be disposed on a predetermined two-dimensional plane within an angular space in which diffracted light from the plurality of hologram components travels, and the plurality of hologram components may be disposed along an normal direction on the two-dimensional plane.

The lighting device may include a shaping optical system for shaping and collimating the coherent light emitted by the light source and causing the coherent light to enter the plurality of hologram components.

According to the present disclosure, it is possible to illuminate the entire region of the region to be illuminated with uniform brightness and with a desired color.

DETAILED DESCRIPTION OF THE INVENTION

Figure 1:
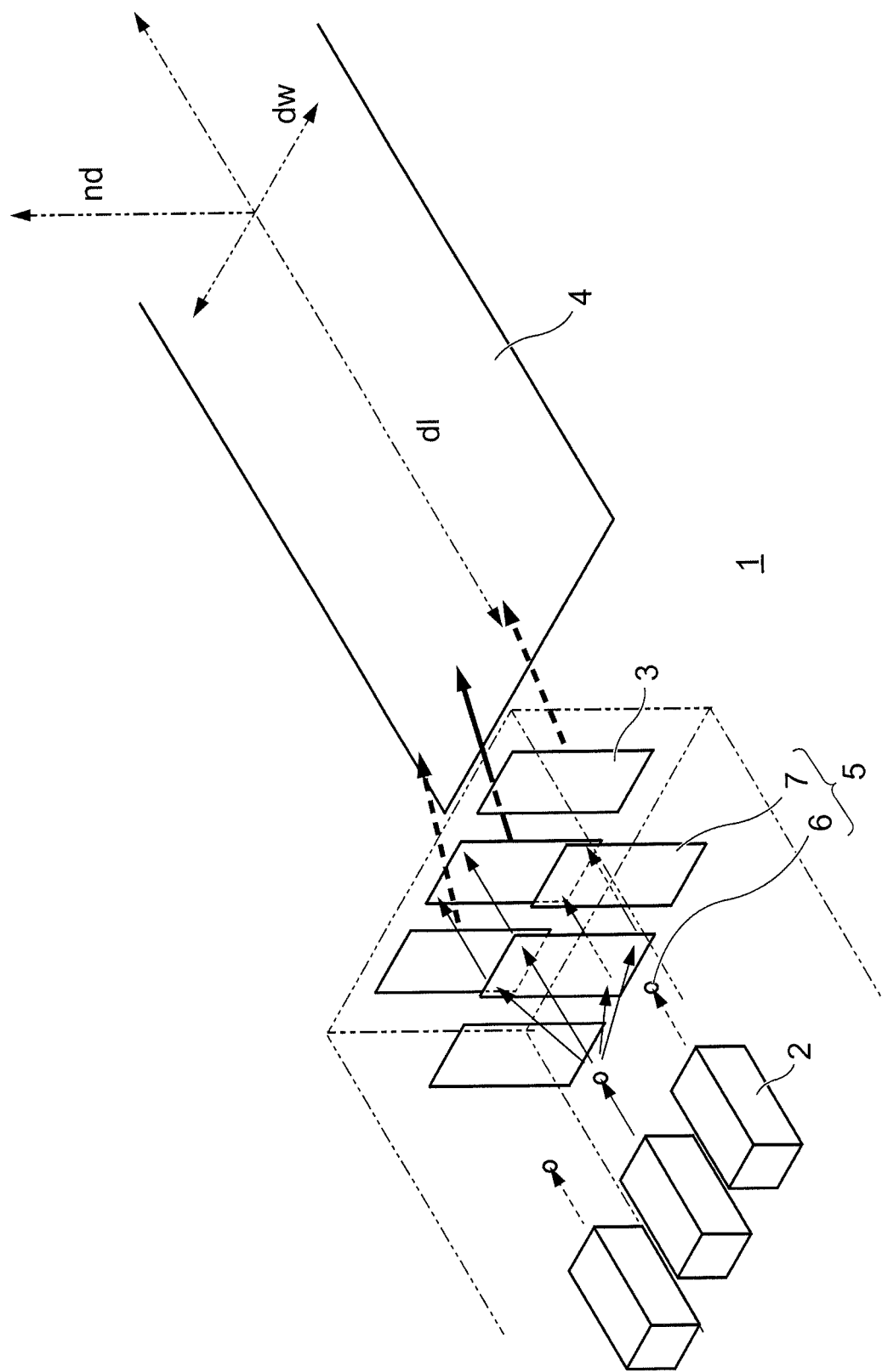
FIG. 1 is a perspective view showing a schematic configuration of a lighting device 1 according to a first embodiment of the present disclosure.

Embodiments of the present disclosure will be described in detail below. Hereinafter, an embodiment of the present disclosure will be described with reference to the drawings. In the drawings attached to the present specification, for convenience of ease of understanding and ease of illustration, scale ratios, longitudinal and lateral dimensional ratios and the like may be exaggerated by changing from the actual ones.

In addition, terms such as "parallel", "orthogonal", "identical" and the like, values of length and angle, etc. which specify shapes and geometrical conditions and their degrees to be used in this specification are not bound by strict meaning, and are interpreted including a range that can expect similar functions.

First Embodiment

FIG. 1 is a perspective view showing a schematic configuration of a lighting device 1 according to a first embodiment of the present disclosure. The lighting device 1 of FIG. 1 includes a light source 2 and a plurality of hologram components 3. The light source 2 emits coherent light. In the example of FIG. 1, the same number of the plurality of light sources 2 as the plurality of hologram components 3 is provided. The number of the light sources 2 is optional. An example in which one light source 2 is provided for each hologram component 3 will be described below. The light source 2 is typically a laser beam source 2 that emits a laser beam. There are various types of laser beam sources 2 such as a semiconductor laser and the like. Any types of laser beam sources 2 may be used.

The wavelength regions of the coherent light emitted from the plurality of light sources 2 may be the same or different. In the following, an example in which the plurality of light sources 2 emits coherent light in different wavelength regions will be described. The coherent light in the different wavelength regions is, for example, three coherent light beams of red, green, and blue in total. Naturally, the light source 2 may emit coherent light of a color other than red, green and blue. In addition, a plurality of light sources 2 in the same wavelength region may be provided to improve the illumination intensity of a region to be illuminated 4.

The lighting device 1 of FIG. 1 includes a plurality of shaping optical systems 5 disposed between a plurality of light sources 2 and the plurality of hologram components 3. Each shaping optical system 5 shapes and collimates the coherent light emitted from the corresponding light source 2.

More specifically, each of the shaping optical systems 5 includes a first lens 6 that spreads the beam diameter of the coherent light emitted from the light source 2, and a second lens 7 that collimates the coherent light that has passed through the first lens 6. The coherent light collimated by the second lens 7 is incident on the corresponding hologram component 3. The optical configuration of the shaping optical system 5 is not limited to FIG. 1.

Coherent light which is emitted by a corresponding light source 2 and shaped by a corresponding shaping optical system 5 is incident on each hologram component 3. Each hologram component 3 diffracts the incident coherent light to illuminate the entire region of the region to be illuminated 4. In the present specification, "the entire region of the region to be illuminated 4" means not only the case where the illumination ranges of the diffracted light diffracted by each hologram component 3 completely match with each other, but also the case where the deviation of the respective illumination ranges is within ±20%. This numerical range is derived from experimental results based on the prototype of the lighting device 1 manufactured by the present inventors.

The region to be illuminated 4 is provided on a predetermined two-dimensional plane in an angular space where diffracted light from the plurality of hologram components 3 travels. The region to be illuminated 4 according to the present embodiment is a region extending in the first direction and extending in the second direction intersecting with the first direction. The shape and size of the region to be illuminated 4 are optional. Typically the region to be illuminated 4 has a longitudinal direction dl corresponding to the first direction and a short direction dw corresponding to the second direction. More specifically, the region to be illuminated 4 is a line-shaped illumination range having a predetermined width in the short direction dw and extending in the longitudinal direction dl. The width of the short direction dw is finite. The length of the longitudinal direction dl is not particularly limited. In addition, the number of regions to be illuminated 4 is not necessarily one. For example, when the lighting device 1 according to the present embodiment is mounted on a vehicle, two line-shaped regions to be illuminated 4 where the longitudinal direction of the vehicle is the longitudinal direction dl may be disposed along the width direction of the vehicle, for example, at an interval corresponding to the width of the vehicle. The advantage of arranging the two regions to be illuminated 4 at an interval corresponding to the width of the vehicle as described above is that when there is any obstacle in the traveling direction of the vehicle, it is possible to determine by the two regions to be illuminated 4 without difficulty whether the vehicle can run avoiding the obstacle.

The plurality of hologram components 3 in FIG. 1 is disposed along the short direction dw of the region to be illuminated 4, and the diffracted light from each hologram component 3 travels along the longitudinal direction dl of the region to be illuminated 4, thereby illuminating the region to be illuminated 4. In the example of FIG. 1, the shaping optical system 5 and the light source 2 are provided in association with each hologram component 3, and both of the plurality of shaping optical systems 5 and the plurality of light sources 2 are disposed along the short direction dw of the region to be illuminated 4.

Figure 2:
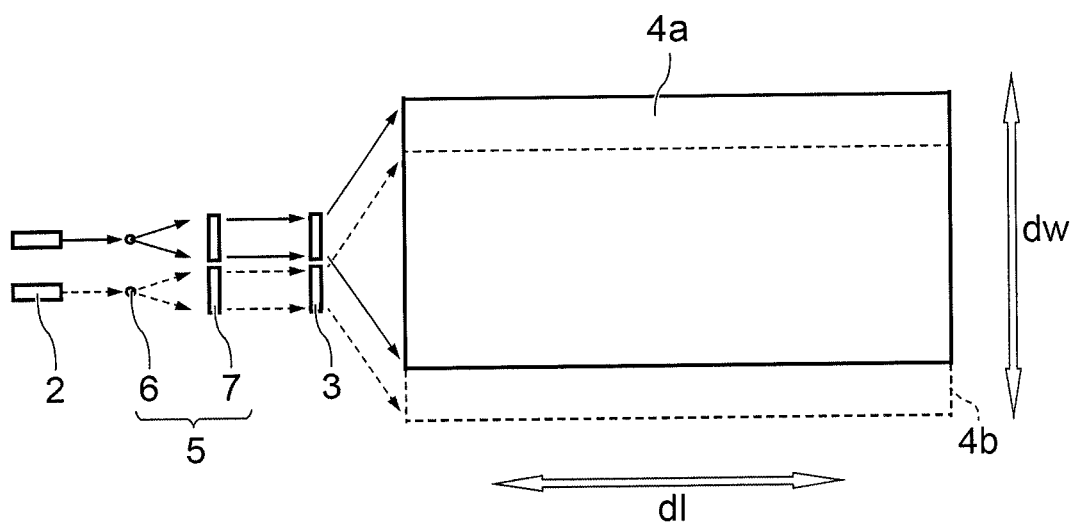
FIG. 2 is a schematic plan view of FIG. 1 when viewed from above.

FIG. 2 is a schematic plan view of FIG. 1 when viewed from above. In FIG. 2, for the sake of simplicity, the number of the light sources 2, the shaping optical systems 5 and the hologram components 3 is two while the number in FIG. 1 is three.

In the case where the plurality of hologram components 3 is disposed along the short direction dw of the region to be illuminated 4 and the diffraction characteristics of the respective hologram components 3 are the same, the shift occurs in the illumination range due to the diffracted light of each hologram components 3 as shown in FIG. 2. This shift occurs to both edge portions extending in the longitudinal direction dl through both end portions of the region to be illuminated 4 in the short direction dw. Therefore, there is concern that both edge portions of the region to be illuminated 4 will be blurred.

Therefore, preferably, the diffraction characteristics of the plurality of hologram components 3 are individually adjusted so that the illumination range due to the diffracted light of each hologram component 3 overlaps as much as possible. That is, it is desirable that the diffraction characteristics of each hologram component 3 be adjusted so that the positions of both edge portions extending in the longitudinal direction dl passing through both end portions of the region to be illuminated 4 in the short direction dw are the same in each hologram component 3.

Figure 3:
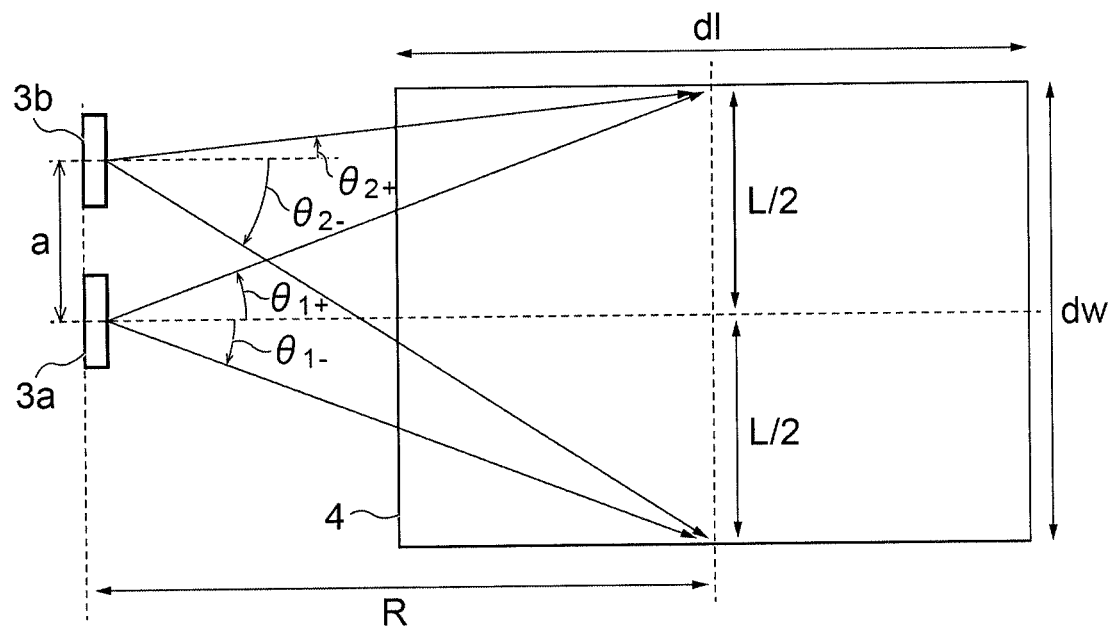
FIG. 3 is a diagram explaining a method of adjusting diffraction characteristics of a first hologram component and a second hologram component.

FIG. 3 is a view for explaining a method of adjusting the diffraction characteristics of two adjacent hologram components 3 (hereinafter, a first hologram component 3a and a second hologram component 3b) along the short direction dw of the region to be illuminated 4. In the example of FIG. 3, the width of the region to be illuminated 4 in the short direction dw is L, the first hologram component 3a is disposed on a line passing through the center in the short direction dw of the region to be illuminated 4 and extending in the longitudinal direction dl, and the second hologram component 3b is disposed apart from the first hologram component 3 by a distance a in the short direction dw of the region to be illuminated 4.

In FIG. 3, the angular range of the diffracted light of the first hologram component 3 is $\theta_{1+}+\theta_{1-}$, and the angular ranges of the diffracted light of the second hologram component 3 is $\theta_{2+}+\theta_{2-}$. R is the shortest distance from the positions of the first hologram component 3 and the second hologram component 3 to an optional position within the region to be illuminated 4.

The angles $\theta_{1+}$ and $\theta_{1-}$ in FIG. 3 are expressed by the following equations (1) and (2), respectively.

$$\tan \theta_{1+} = L/(2R) \quad (1)$$

$$\tan \theta_{1-} = -L/(2R) \quad (2)$$

The angles $\theta_{2+}$ and $\theta_{2-}$ in FIG. 3 are expressed by the following equations (3) and (4) respectively.

$$\tan \theta_{2+} = 1/R \times (L/2 - a) \quad (3)$$

$$\tan \theta_{2-} = 1/R \times (-L/2 - a) \quad (4)$$

As described above, the condition for providing illumination across the width of the region to be illuminated 4 in the short direction dw at the position of the distance R from the first hologram component 3a is that the first hologram component 3a has diffraction angles $\theta_{1+}$ and $\theta_{1-}$ that satisfy the above-mentioned equations (1) and (2) respectively. As described above, the condition for providing illumination across the width of the region to be illuminated 4 in the short direction dw at the position of the distance R from the second hologram component 3b is that the second hologram component 3b has diffraction angles $\theta_{2+}$ and $\theta_{2-}$ that satisfy the above-mentioned equations (3) and (4) respectively.

As can be seen from the above equations (1) to (4), even when the width L of the region to be illuminated 4 in the short direction dw is constant, when the distance R changes, the angles $\theta_{1+}$, $\theta_{1-}$, $\theta_{2+}$, and $\theta_{2-}$ are changed. That is, it is necessary to adjust the diffraction characteristics of the first hologram component 3a and the second hologram component 3b for each distance R.

In this manner, in order to make the positions of both edge portions in the longitudinal direction dl of the region to be illuminated 4 match with each other by the plurality of hologram components 3, it is necessary to adjust the diffraction characteristics of the hologram components 3 based on the equations (1) to (4) for each of the distances R described above.

Therefore, in the present embodiment, it is assumed that a computer-generated hologram (CGH) is used as the plurality of hologram components 3. The CGH does not require the light source 2 that emits object light, an optical system for forming the interference fringe, a blank hologram recording material for forming the interference fringe, or the like. Since the process of recording the interference fringe can be performed on a computer, it is possible to easily generate the interference fringe having optional diffraction characteristics.

According to the above equations (1) to (4), the positions of both edge portions in the longitudinal direction dl of the region to be illuminated 4 by the diffracted light of the plurality of hologram components 3 can be aligned. However, even if the positions of both edge portions are aligned, depending on the illumination intensity within the region to be illuminated 4, the visibility of the region to be illuminated 4 may be deteriorated or both edge portions of the region to be illuminated 4 may be visually blurrily recognized.

Although each hologram component 3 is designed to illuminate the entire region of the region to be illuminated 4, the illuminance is not necessarily uniform over the entire region of the region to be illuminated 4, and the illuminance tends to be higher at the central portion in the short direction dw than at both end portions. This is because both end portions of the region to be illuminated 4 in the short direction dw have a longer average distance from each hologram component 3 than the central portion although the illuminance depends on the placement position of each hologram component 3. When the illuminance is lowered, both edge portions are visually blurrily recognized by the eyes of a person. Thus, even if the edge portions of the region to be illuminated 4 are aligned by the diffracted light of each hologram component 3 based on the above-described equations (1) to (4), the edge portions are visibly blurred. In general, when the illuminance of the edge portion of the illumination range is made higher than the illuminance of the central portion of the illumination range, the illumination range is clearly felt by the eyes of a person.

Therefore, in the present embodiment, at least one of the plurality of hologram components 3 is adjusted in diffraction characteristics such that the illuminance at the both end portions in the short direction dw of the region to be illuminated 4 are made higher than the illuminance at the central portion.

Figure 4:
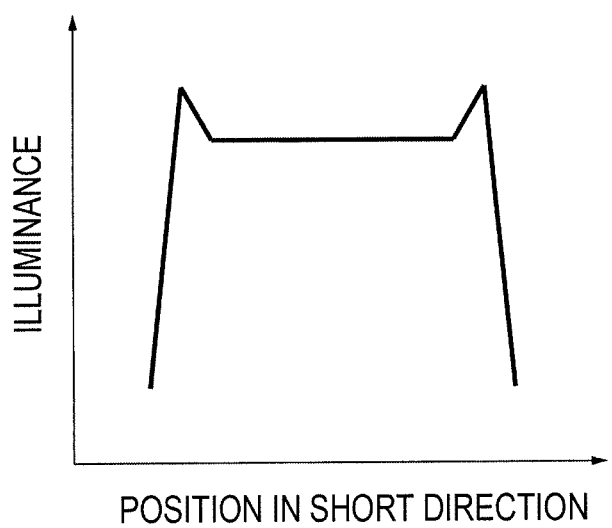
FIG. 4 is a graph showing diffraction characteristics of a hologram component according to a second embodiment.

FIG. 4 is a graph showing diffraction characteristics of at least one hologram component 3. The horizontal axis represents position coordinates of the region to be illuminated 4 in the short direction dw, and the vertical direction represents illuminance. The illuminance is a physical quantity representing the brightness of the region to be illuminated 4 which is felt by the eyes of a person, and its unit is lux [lx].

As shown in the drawing, in the present embodiment, the illuminance at the both end portions of the region to be illuminated 4 in the short direction dw is made higher than the illuminance at the central portion. As a result, both edge portions extending in the longitudinal direction dl passing through both end portions of the region to be illuminated 4 in the short direction dw are more remarkably visually recognized, and the visibility of the region to be illuminated 4 is improved.

As described in detail in a third embodiment to be described later, when the plurality of hologram components 3 provides illuminations of, for example, red, green, and blue, all the hologram components 3 are not required to have diffraction characteristics as shown in FIG. 4. Only the hologram component 3 that provides illumination of some colors may have diffraction characteristics as shown in FIG. 4.

As a result, the color tone can be slightly changed between the central portion and the edge portion of the region to be illuminated 4, and illumination with good visibility can be provided. As a specific example, even when the entire region to be illuminated 4 is basically illuminated with white light, the central portion may be illuminated slightly bluishly and the edge portion may be illuminated slightly yellowish. Thus, it is possible to further emphasize the edge portion.

As described above, in the present embodiment, since the diffraction characteristics of at least one hologram component 3 is adjusted so that the illuminance at the both end portions in the short direction dw of the region to be illuminated 4 is made to be higher than the illuminance at the central portion, both edge portions extending in the longitudinal direction dl of the region to be illuminated 4 are clearly visually recognized. Thus, the visibility of the entire region to be illuminated 4 can be improved.

Second Embodiment

In the second embodiment, each hologram component 3 has the plurality of element hologram components 3a. The overall configuration of the lighting device 1 according to the second embodiment is the same as that of FIG. 1. The structure of each hologram component 3 is different.

Figure 5:
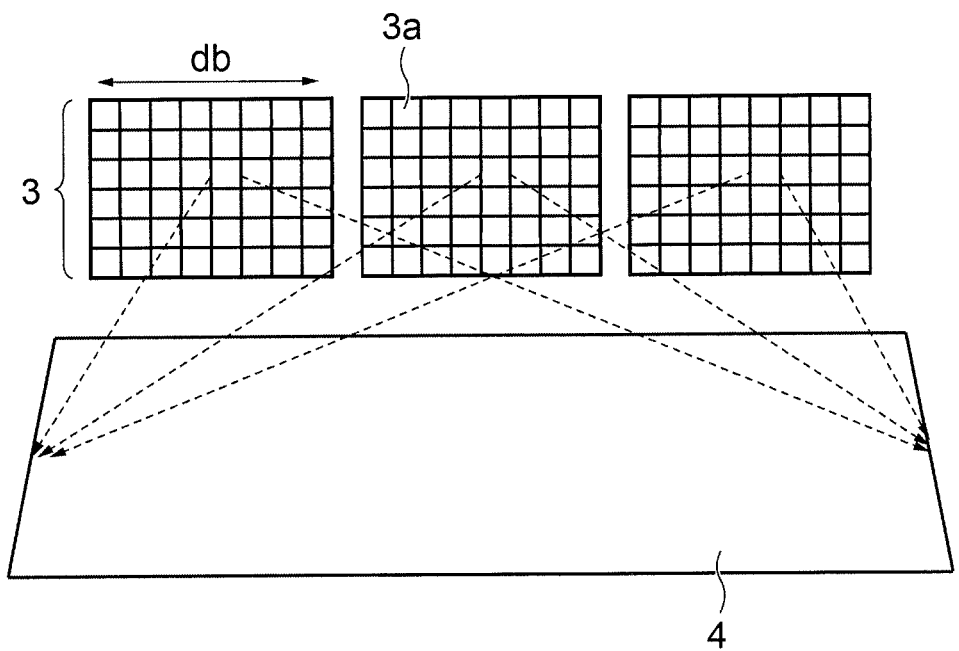
FIG. 5 is a schematic view of a main part of a lighting device according to the second embodiment.

FIG. 5 is a schematic view of a main part of a lighting device 1 according to the second embodiment. Each hologram component 3 according to the second embodiment has the plurality of element hologram components 3a divided vertically and horizontally. Each of the element hologram components 3a has diffraction characteristics capable of illuminating the entire region of the region to be illuminated 4. The size of each element hologram component 3a is not necessarily identical. Among the three hologram components 3, only part of the hologram component 3 has a plurality of element holograms, the remaining hologram components 3 may have a single structure. In the following, for simplicity of explanation, an example in which each hologram component 3 has the plurality of element hologram components 3a will be described.

Each hologram component 3 has the plurality of element hologram components 3a, and each element hologram component 3a is made to illuminate the entire region of the region to be illuminated 4, so that it is possible to weaken the laser intensity in the region to be illuminated 4 and to improve the safety of the laser beam (coherent light). Since each element hologram component 3a diffuses the coherent light incident on the incident surface to the entire region of the region to be illuminated 4, the light intensity at each point in the region to be illuminated 4 is considerably smaller than the light intensity of the coherent light emitted from the light source 2. Therefore, even when the line of sight is directed in the direction of the light source 2 from an any point in the region to be illuminated 4, the possibility of damaging the eyes of a person is reduced. Coherent light from the plurality of element hologram components 3a is incident on each point in the region to be illuminated 4 at different incident angles. As a result, the interference patterns of light are superimposed uncorrelated and averaged, and thus, the speckles observed by the eyes of a person are not conspicuous in the region to be illuminated 4.

Also in the second embodiment, the diffraction characteristics of the plurality of element hologram components 3a in each hologram component 3 are adjusted so that the position of the edge portion of the line-shaped region to be illuminated 4 does not shift for each hologram component 3. Further, in the second embodiment, the diffraction characteristics of the plurality of element hologram components 3a in at least one hologram component 3 are adjusted so that the illuminance at the both end portions in the short direction dw of the region to be illuminated 4 is higher than the illuminance at the central portion.

As described above, in the second embodiment, since each hologram component 3 has the plurality of element hologram components 3a, it is possible to adjust diffraction characteristics for each element hologram component 3a.

Thus, adjustment can be made such that the illuminance at the both end portions in the short direction dw of the region to be illuminated 4 is higher than the illuminance at the central portion, and adjustment can be made such that the positions of both edge portions extending in the longitudinal direction dl passing through both end portions of the region to be illuminated 4 in the short direction dw are aligned.

In addition, each hologram component 3 is composed of the plurality of element hologram components 3a, and each element hologram component 3a is made to illuminate the entire region of the region to be illuminated 4, so that the light intensity of the illumination light in the region to be illuminated 4 can be reduced, and the safety of the laser beam can be improved and speckles are less conspicuous.

Third Embodiment

In the third embodiment, the radiation intensity is changed for each color at both end portions and the central portion in the short direction dw of the region to be illuminated 4.

Figure 6:
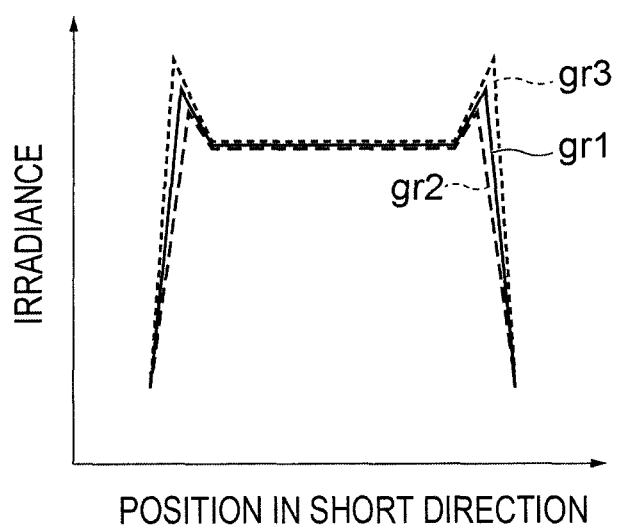
FIG. 6 is a graph showing diffraction characteristics of a hologram component according to a third embodiment.

FIG. 6 is a graph showing diffraction characteristics of at least one hologram component 3. The horizontal axis represents position coordinates of the region to be illuminated 4 in the short direction dw, and the vertical direction represents irradiance. The irradiance is a physical quantity representing radiant energy per unit region in the region to be illuminated 4. In FIG. 6, the graph gr1 shows the characteristics of the red illumination light, the graph gr2 shows the characteristics of the green illumination light, and the graph gr3 shows the characteristics of the blue illumination light.

As shown in FIG. 6, in this embodiment, irradiance differs for each color of illumination light. The reason why the irradiance is different for each color of the illumination light is because the visibility and the degree of blur of the region to be illuminated 4 which the eyes of a person feels depends on the illumination color of the region to be illuminated 4.

For example, in a case where illuminating the line-shaped region to be illuminated 4 with white light, when the central portion of the short direction dw of the region to be illuminated 4 is illuminated in bluish white, and both end portions of the short direction dw are illuminated in yellowish white, the region to be illuminated 4 is felt easy to see and the edge portion of the region to be illuminated 4 is clearly felt.

Therefore, in the present embodiment, for each hologram component 3 with different illumination colors, the ratio of the irradiance of the central portion to the irradiance of both end portions of the region to be illuminated 4 in the short direction dw can be individually adjusted.

The degree of adjustment may be determined by the illumination color of the region to be illuminated 4, the type of the light source 2, and the like. That is, the irradiance in FIG. 6 is merely an example and any setting may be allowed.

In the example of FIG. 6, with the green illumination color, the ratio of the irradiation illuminance at the central portion to the irradiation illuminance at both end portions in the short direction dw is small, compared with the case of the other illumination colors. The reason is that since green affects brightness, when the ratio is large, the brightness in the region to be illuminated 4 becomes nonuniform.

Since green can give a large difference in illuminance, edges along the longitudinal direction of the region to be illuminated 4 can be easily seen by increasing the illuminance at the both end portions in the short direction dw. Although red and blue may not give a large difference in illuminance, since the chromaticity changes greatly, it is also easy to visually recognize the edge along the longitudinal direction of the region to be illuminated 4. In this way, depending on the illumination color of the region to be illuminated 4, it is possible to give a difference in illuminance (irradiance) or chromaticity between the central portion and the edge of the region to be illuminated 4. This makes it possible to improve the visibility of the region to be illuminated 4.

In the above description, it is not clearly indicated whether each hologram component 3 is divided into the plurality of element hologram components 3a. However, each hologram component 3 in the third embodiment is not limited to a plurality of element hologram components 3a. It may be divided or may have a single structure.

In the case where each hologram component 3 is divided into the plurality of element hologram components 3a, the diffraction characteristics may be adjusted so that the irradiance is as shown in FIG. 6 for each of the element hologram components 3a.

Although FIG. 6 shows the radiation intensity, as with the first and second embodiments, the diffraction characteristics may be adjusted for each hologram component 3 corresponding to each illumination color so that the illuminance at the both end portions of the region to be illuminated 4 in the short direction dw is higher than the illuminance at the central portion.

According to the present embodiment, by adjusting such that the radiation intensity is made to be different between the central portion and the both end portions in the short direction dw of the region to be illuminated 4, as a result, the illuminance at the both end portions in the short direction dw can be made higher than the illuminance of the central portion.

As described above, in the third embodiment, for each hologram component 3 having different illumination colors, since the irradiance is made to differ between both end portions and the central portion in the short direction dw of the region to be illuminated 4, it is possible to perform illumination so as to emphasize the edge portion of the region to be illuminated 4, whereby the edge portion can be more clearly illuminated.

Fourth Embodiment

In the above-described first to third embodiments, as shown in FIGS. 1 and 2, an example is shown in which the plurality of hologram components 3 is disposed along the short direction dw of the region to be illuminated 4. The plurality of hologram components 3 may be disposed along the normal direction nd of the region to be illuminated 4. That is, the plurality of hologram components 3 may be disposed along the short direction dw of the region to be illuminated 4 disposed on a predetermined two-dimensional plane in the angular space where the diffracted light from each hologram component 3 travels, and may be disposed in the normal direction nd of the two-dimensional plane.

Figure 7:
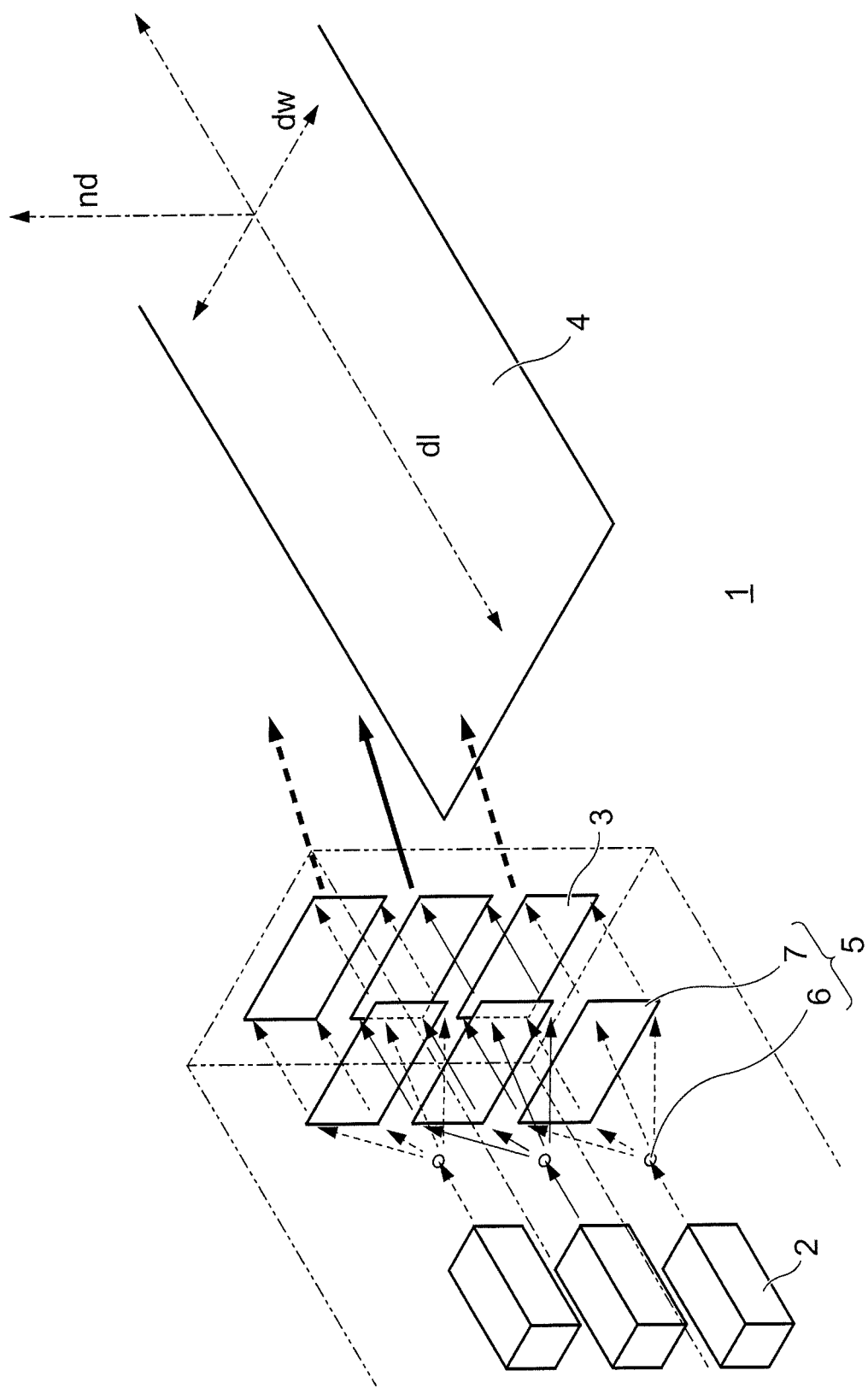
FIG. 7 is a perspective view showing a schematic configuration of a lighting device in which a plurality of hologram components is disposed along nd of a region to be illuminated.

FIG. 7 is a perspective view showing a schematic configuration of a lighting device 1 in which a plurality of hologram components 3 is disposed along a normal direction nd of a region to be illuminated 4. As with FIG. 1, each hologram component 3 in FIG. 7 illuminates the entire region of the region to be illuminated 4.

Figure 8:
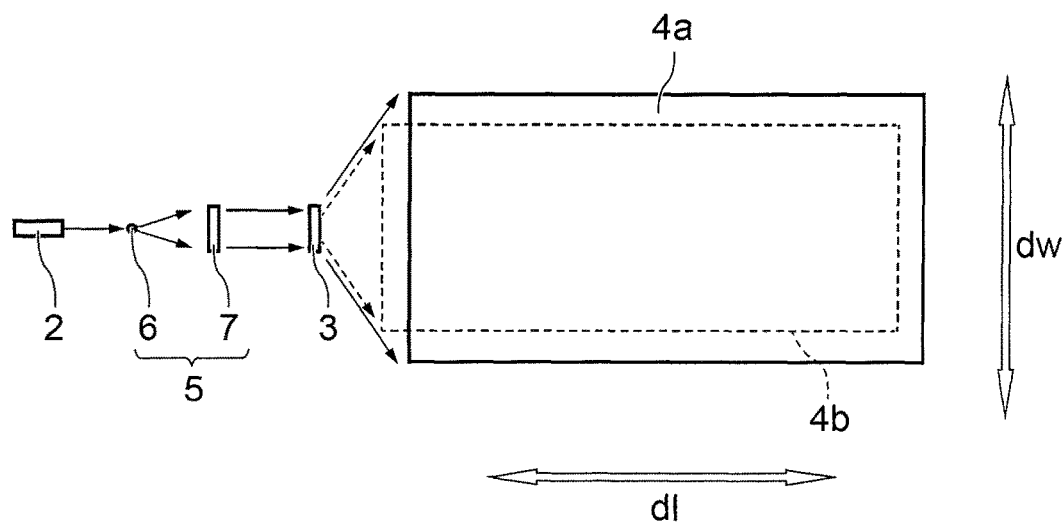
FIG. 8 is a view for explaining a shift of an illumination range in a fourth embodiment.

However, as shown in FIG. 7, when a plurality of hologram components 3 is vertically placed, the illumination ranges by the diffracted light of each hologram component 3 do not necessarily match with each other. As shown in FIG. 8, the region to be illuminated 4 may be shifted in both the short direction dw and the longitudinal direction dl. The illumination range 4a indicated by the solid line in FIG. 8 is the original region to be illuminated 4, whereas the dashed line shows the shifted illumination range 4b.

Therefore, as shown in FIG. 7, when the plurality of hologram components 3 is placed vertically, the diffraction characteristics are adjusted for each hologram component 3 so that the illumination range for each hologram component 3 matches with the region to be illuminated 4. More specifically, the diffraction characteristics are adjusted so that the positions of both end portions extending in the longitudinal direction dl passing through both edge portions in the short direction dw in the region to be illuminated 4 match for each hologram component 3, and the positions of both end portions extending in the short direction dw passing through both edge portions in the longitudinal direction dl in the region to be illuminated 4 match for each hologram component 3.

In the case where each hologram component 3 has the plurality of element hologram components 3a and each element hologram component 3a illuminates the entire region of the region to be illuminated 4, the diffraction characteristics are adjusted so that the positions of the four edge portions extending in the longitudinal direction dl and the short direction dw are aligned for each element hologram component 3a.

Even when the plurality of hologram components 3 is placed vertically, as with the first to third embodiments, adjustment is performed so that the illuminance or the irradiance differs between the central portion and both end portions of the short direction dw within the region to be illuminated 4, thereby improving the visibility of the region to be illuminated 4.

Figure 9:
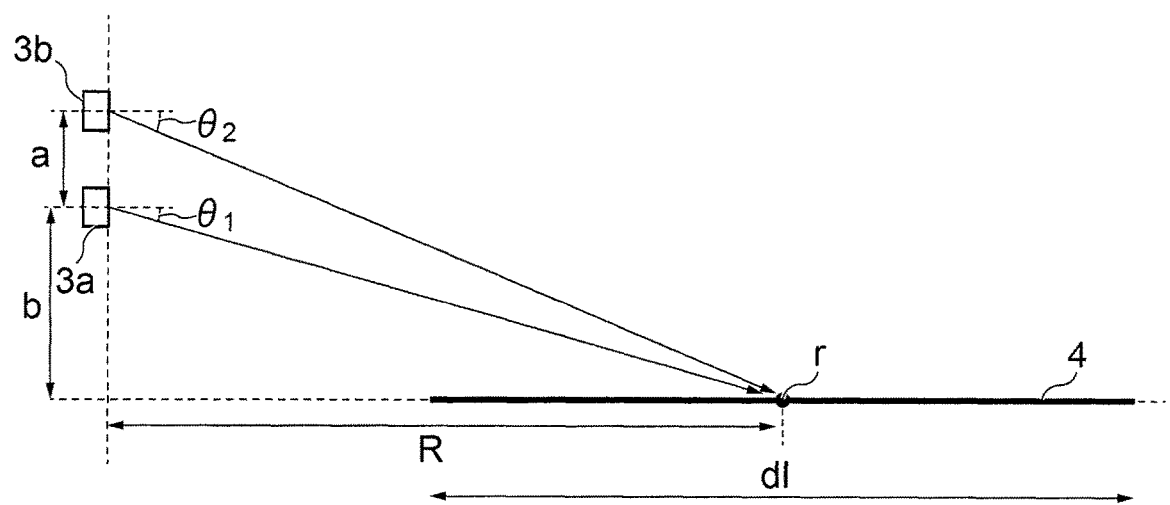
FIG. 9 is a view explaining a method of adjusting diffraction characteristics of a plurality of vertically placed hologram components.

FIG. 9 is a view explaining a method of adjusting diffraction characteristics of a plurality of vertically placed hologram components 3. In FIG. 9, the first hologram component 3 is disposed by a distance b above the two-dimensional plane where the region to be illuminated 4 is present, and the second hologram component 3 is disposed above the first hologram component 3 by a distance a. FIG. 9 shows an example in which the illumination ranges at the position r apart from the first hologram component 3 and the second hologram component 3 by the distance R in the longitudinal direction dl of the region to be illuminated 4 are made to match. The angle formed by the direction of the ray from the first hologram component 3 toward the position r and the two-dimensional plane where the region to be illuminated 4 is present is set to θ1. The angle formed by the direction of the intersecting line from the second hologram component 3 toward the position r and the two-dimensional plane is set to θ2.

The following equation (5) is established between the angle θ1, the distance b, and the distance R.

$$\tan \theta_1 = b/R \quad (5)$$

Also, the following equation (6) is established between the angle θ2, the distance a, the distance b, and the distance R.

$$\tan \theta_2 = (b+a)/R \quad (6)$$

When the diffraction characteristics of each hologram component 3 are adjusted so as to satisfy equation (5) and equation (6) for each distance R, it is possible to align the positions of both edge portions passing through both end portions in the longitudinal direction dl and extending in the short direction dw of the region to be illuminated 4. In order to align the positions of both edge portions passing through both end portions in the longitudinal direction dl and extending in the short direction dw of the region to be illuminated 4, the diffraction characteristics of each hologram component 3 may be adjusted so as to satisfy the above-described equations (3) and (4).

As described above, even when the plurality of hologram components 3 is placed vertically, as with the case where the hologram components 3 are placed horizontally, by adjusting the diffraction characteristics of each hologram component 3, it is possible to clearly illuminate the region to be illuminated 4 for the eyes of a person.

While several embodiments of the present disclosure have been described, these embodiments are presented by way of example and are not intended to limit the scope of the invention. These novel embodiments can be implemented in various other forms and various omissions, substitutions, and changes can be made without departing from the spirit of the invention. These embodiments and modifications thereof are included in the scope and gist of the invention and are included in the invention described in the claims and the equivalent scope thereof.

REFERENCE SIGNS LIST

1 Lighting device
2 Light source
3 Hologram component
4 Region to be illuminated
5 Shaping optical system
6 First lens
7 Second lens

The invention claimed is:

1. A lighting device that illuminates an illumination region extending in a first direction and extending in a second direction intersecting with the first direction, the lighting device comprising:
   a light source that emits coherent light;
   a plurality of hologram components, each of which diffracts the coherent light emitted by the light source to illuminate at least a part of the illumination region to be superimposed; and
   a shaping optical system that shapes and collimates the coherent light emitted by the light source and causes the coherent light to enter the plurality of hologram components,
   wherein at least one of the plurality of hologram components diffracts the incident coherent light so that an illuminance at both end portions of the illumination region in the second direction is higher than an illuminance at a central portion of the illumination region.

2. The lighting device according to claim 1,
   wherein at least one of the plurality of hologram components includes a plurality of element hologram components, and
   wherein the element hologram components diffract incident coherent light to illuminate at least a part of the illumination region to be superimposed.

3. The lighting device according to claim 2, wherein at least one of the plurality of element hologram components diffracts the incident coherent light so that the illuminance at the both end portions in the second direction of the illumination region is higher than the illuminance at the central portion of the illumination region in the second direction.

4. The lighting device according to claim 1, wherein the plurality of hologram components diffracts the incident coherent light so that both edge positions of the illumination region passing through both end portions of the illumination region in the second direction and extending in the first direction are aligned.

5. The lighting device according to claim 1, wherein the plurality of hologram components diffract the incident coherent light so that both edge positions passing through both end portions of the illumination region in the first direction and extending in the second direction are aligned.

6. The lighting device according to claim 1,
   wherein the illumination region is disposed on a predetermined two-dimensional plane within an angular space through which diffracted light from the plurality of hologram components passes, and
   wherein the plurality of hologram components is disposed along the second direction on the two-dimensional plane.

7. The lighting device according to claim 1,
   wherein the illumination region is disposed on a predetermined two-dimensional plane within an angular space through which diffracted light from the plurality of hologram components passes, and
   wherein the plurality of hologram components is disposed along a normal direction on the two-dimensional plane.

8. A lighting device that illuminates an illumination region extending in a first direction and extending in a second direction intersecting with the first direction, the lighting device comprising:
   a plurality of light sources, each of which emits coherent light in different wavelength regions;

a plurality of hologram components, each of which diffracts the coherent light emitted by a corresponding light source among the plurality of light sources to illuminate at least a part of the illumination region to be superimposed with different illumination colors; and a shaping optical system that shapes and collimates the coherent light emitted by the light source and causes the coherent light to enter the plurality of hologram components, wherein the plurality of hologram components diffract the incident coherent light so that an irradiance at both end portions of the illumination region in the second direction higher than an irradiance at a central portion of the illumination region.

9. The lighting device according to claim 8, wherein at least one of the plurality of hologram components diffracts the incident coherent light so that an illuminance at both end portions of the illumination in the second direction of the illumination region is higher than an illuminance at the central portion of the illumination region.

10. The lighting device according to claim 8, wherein at least one of the plurality of hologram components includes a plurality of element hologram components, and wherein the element hologram components diffract incident coherent light to illuminate at least a part of the illumination region to be superimposed.

11. The lighting device according to claim 10, wherein at least one of the plurality of element hologram components diffracts the incident coherent light so that an illuminance at both end portions of the illumination region in the second direction is higher than an illuminance at the central portion of the illumination region.

12. The lighting device according to claim 8, wherein the plurality of hologram components diffract the incident coherent light so that both edge positions of the illumination region passing through both end portions of the illumination region in the second direction and extending in the first direction are aligned.

13. The lighting device according to claim 8, wherein the plurality of hologram components diffract the incident coherent light so that both edge positions of the illumination region passing through both end portions of the illumination region in the first direction and extending in the second direction are aligned.

14. A lighting device that illuminates an illumination region extending in a first direction and extending in a second direction intersecting with the first direction, the lighting device comprising:

a light source that emits coherent light;

a plurality of hologram components, each of which diffracts the coherent light emitted by the light source to illuminate at least a part of the illumination region to be superimposed; and a shaping optical system that shapes and collimates the coherent light emitted by the light source and causes the coherent light to enter the plurality of hologram components, wherein at least one of the plurality of hologram components diffracts the incident coherent light so that a chromaticity value at both end portions of the illumination region in the second direction is different from a chromaticity value at a central portion of the illumination region.

15. The lighting device according to claim 14, wherein the plurality of hologram components diffract the incident coherent light so that both edge positions of the illumination region passing through both end portions of the illumination region in the second direction and extending in the first direction are aligned.

16. The lighting device according to claim 14, wherein the plurality of hologram components diffract the incident coherent light so that both edge positions of the illumination region passing through both end portions of the illumination region in the first direction and extending in the second direction are aligned.

17. The lighting device according to claim 14, wherein the region is disposed on a predetermined two-dimensional plane within an angular space through which diffracted light from the plurality of hologram components passes, and wherein the plurality of hologram components is disposed along the second direction on the two-dimensional plane.

18. The lighting device according to claim 14, wherein the region is disposed on a predetermined two-dimensional plane within an angular space through which diffracted light from the plurality of hologram components passes, and wherein the plurality of hologram components is disposed along an normal direction on the two-dimensional plane.

* * * * *